(12) United States Patent
Nakayama et al.

(10) Patent No.: US 10,323,995 B2
(45) Date of Patent: Jun. 18, 2019

(54) ROTATION-SHAFT JOINT STRUCTURE

(71) Applicant: Fanuc Corporation, Yamanashi (JP)

(72) Inventors: Kazutaka Nakayama, Yamanashi (JP); Kenichiro Oguri, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/824,361

(22) Filed: Nov. 28, 2017

(65) Prior Publication Data

US 2018/0195915 A1 Jul. 12, 2018

(30) Foreign Application Priority Data

Jan. 6, 2017 (JP) ................................ 2017-001337

(51) Int. Cl.
*G01L 3/00* (2006.01)
*G01L 3/10* (2006.01)
*B25J 13/08* (2006.01)
*B25J 19/00* (2006.01)

(52) U.S. Cl.
CPC ............. *G01L 3/108* (2013.01); *B25J 13/085* (2013.01); *B25J 19/0029* (2013.01)

(58) Field of Classification Search
CPC ...... G01L 3/108; B25J 13/085; B25J 19/0029
USPC .................................................. 73/862.045
See application file for complete search history.

(56) References Cited

U.S. PATENT DOCUMENTS

| | | | | |
|---|---|---|---|---|
| 6,119,562 A | * | 9/2000 | Jenkins ............... | B25B 23/1427 81/479 |
| 2002/0152849 A1 | * | 10/2002 | Jenkins ............... | B25B 23/1425 81/479 |
| 2004/0052630 A1 | * | 3/2004 | Nihei ..................... | B25J 13/085 414/730 |
| 2007/0049435 A1 | * | 3/2007 | Jinno ...................... | B25J 9/104 474/148 |
| 2007/0063523 A1 | * | 3/2007 | Koyama .............. | B25J 15/0009 294/106 |

(Continued)

FOREIGN PATENT DOCUMENTS

| CN | 203772475 U | 8/2014 |
|---|---|---|
| EP | 2853359 A1 | 4/2015 |

(Continued)

OTHER PUBLICATIONS

Japan Patent Office, Office Action dated Jul. 31, 2018 for Japan Patent Application No. 2017-001337.

(Continued)

*Primary Examiner* — Max H Noori
*Assistant Examiner* — Masoud H Noori
(74) *Attorney, Agent, or Firm* — Winstead PC (57) ABSTRACT

A force acting on a link is detected at low cost. Provided is a rotation-shaft joint structure including: a driving-force generating part including a fixed member that is fixed to a base member, and a movable member that is rotationally driven about a predetermined axis relative to the fixed member; a link member that is fixed to the movable member of the driving-force generating part; and a uniaxial strain sensor that is attached to the link member or the movable member, at a surface located in a space between a fixed area over which the link member is fixed to the movable member and the outer circumferential surface of the driving-force generating part about the axis, to detect the strain of the surface.

8 Claims, 14 Drawing Sheets

(56) References Cited

U.S. PATENT DOCUMENTS

| | | | | |
|---|---|---|---|---|
| 2007/0299427 A1* | 12/2007 | Yeung | ................... | B25J 9/047 |
| | | | | 606/1 |
| 2009/0126535 A1* | 5/2009 | Cho | ................... | B25B 21/00 |
| | | | | 81/57.29 |
| 2013/0090580 A1* | 4/2013 | Hong | ................... | A61H 1/0277 |
| | | | | 601/33 |
| 2015/0081095 A1 | 3/2015 | Shiraki et al. | | |
| 2015/0210349 A1* | 7/2015 | Liu | ................... | B62M 6/55 |
| | | | | 180/206.4 |
| 2018/0147734 A1* | 5/2018 | Nakayama | ................ | B25J 17/00 |

FOREIGN PATENT DOCUMENTS

| | | |
|---|---|---|
| JP | S60-236022 A | 11/1985 |
| JP | H01-103281 A | 4/1989 |
| JP | H01-301091 A | 12/1989 |
| JP | H05-066534 U | 9/1993 |
| JP | 2002-162300 A | 6/2002 |
| JP | 2011-056601 A | 3/2011 |
| JP | 2012-181189 A | 9/2012 |
| JP | 2013-094951 A | 5/2013 |
| JP | 2016-74055 A | 5/2016 |
| WO | WO-2013175553 A1 | 11/2013 |

OTHER PUBLICATIONS

Japan Patent Office, Search Report dated Jul. 26, 2018 for Japan Patent Application No. 2017-001337.
State Intellectual Property Office of the People'S Republic of China, Office Action dated Mar. 18, 2019 for Application No. 201810004279. 9. 1 v.

\* cited by examiner

ROTATION-SHAFT JOINT STRUCTURE

CROSS-REFERENCE TO RELATED APPLICATIONS

This application is based on Japanese Patent Application No. 2017-001337, the contents of which are incorporated herein by reference.

TECHNICAL FIELD

The present invention relates to a rotation-shaft joint structure.

BACKGROUND ART

A known force measuring module in the related art measures a force and a moment applied to a link and a joint (for example, see Patent Literature 1).

CITATION LIST

Patent Literature

{PTL 1} Japanese Unexamined Patent Application, Publication No. 2011-56601

SUMMARY OF INVENTION

Technical Problem

Solution to Problem

An aspect of the present invention provides a rotation-shaft joint structure including: a driving-force generating part that includes a fixed member that is fixed to a base member, and a movable member that is rotationally driven about a predetermined axis relative to the fixed member; a link member that is fixed to the movable member of the driving-force generating part; and a uniaxial strain sensor that is attached to the link member or the movable member, at a surface located in a space between a fixed area over which the link member is fixed to the movable member and the outer circumferential surface of the driving-force generating part about the axis, to detect the strain of the surface.

In the above-described aspect, the outside diameter of the movable member may be smaller than the outside diameter of the fixed member, and the uniaxial strain sensor may be disposed on the surface of the link member that is substantially parallel to the axis.

In the above-described aspect, the uniaxial strain sensor may be fixed to the surface with a screw.

In the above-described aspect, the uniaxial strain sensor may include an amplifier that converts the detected amount of strain into a current value or a voltage value.

In the above-described aspect, the uniaxial strain sensor may include a serial communication circuit.

In the above-described aspect, at least two of the uniaxial strain sensors may be provided side-by-side.

In the above-described aspect, the uniaxial strain sensor may be capable of detecting a strain with at least two circuits in parallel.

In the above-described aspect, the rotation-shaft joint structure may further include a cover for covering the uniaxial strain sensor.

DESCRIPTION OF EMBODIMENTS

A rotation-shaft joint structure 1 according to an embodiment of the present invention will be described below with reference to the drawings.

Figure 1:
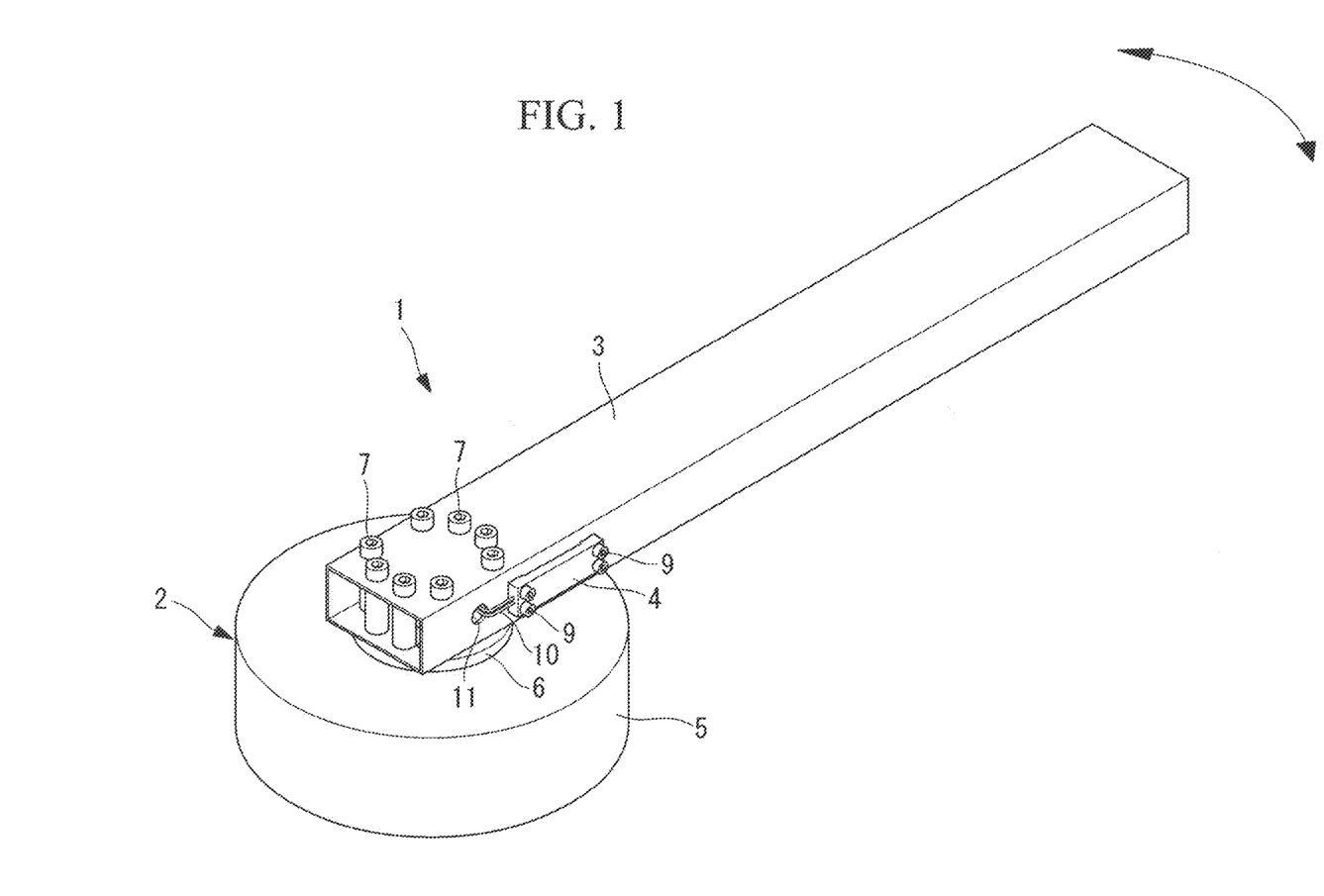
FIG. 1 is a perspective view of a rotation-shaft joint structure according to an embodiment of the present invention.
Figure 2:
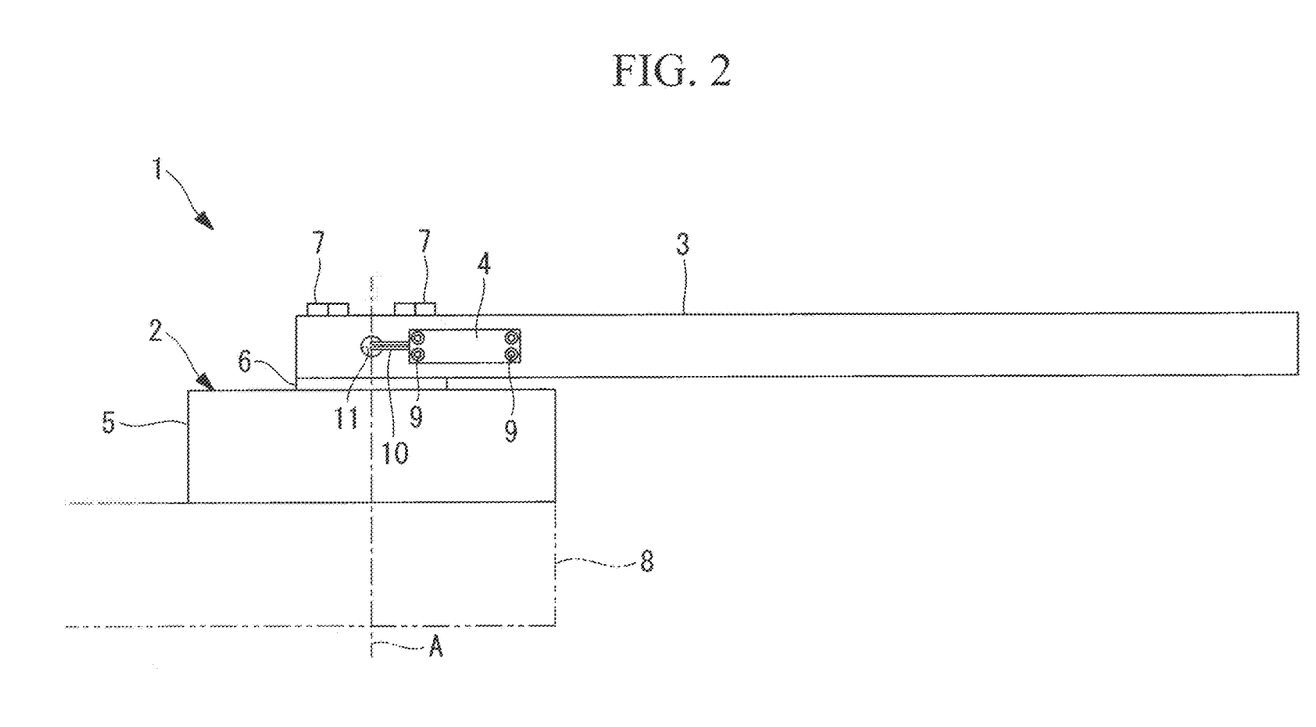
FIG. 2 is a side view of the rotation-shaft joint structure in FIG. 1.

As shown in FIGS. 1 and 2, the rotation-shaft joint structure 1 according to this embodiment includes a rotation-shaft module (a driving-force generating part) 2, a link member 3 having one end fixed to the rotation-shaft module 2, and a uniaxial strain sensor 4 fixed to a surface of the link member 3.

The rotation-shaft module 2 includes a fixed member 5 that is formed in a substantially cylindrical shape, and a circular-disc-shaped movable member 6 that has a smaller outside diameter than the fixed member 5 and that is provided near the center of one end face of the fixed member 5 so as to project in a direction parallel to the central axis (axis) A of the fixed member 5 from the one end face. The fixed member 5 accommodates, inside thereof, a motor (not shown), and the actuation of the motor can rotate the movable member 6 about the central axis A of the fixed member 5, relative to the fixed member 5.

An end face of the movable member 6 serves as an attachment surface to which the link member 3 is fixed. The attachment surface is provided with, for example, a plurality of screw holes (not shown) to which bolts 7 passing through the link member 3 are fastened.

As shown in FIG. 2, the end face of the fixed member 5 opposite from the movable member 6 serves as an attachment surface at which the fixed member 5 is fixed to an outside base member 8, for example, a pivot base that is horizontally pivoted or an end of a link member of another rotation-shaft module.

In the example shown in FIG. 1, the link member 3 is formed of, for example, a hollow rectangular pipe. One end of the link member 3 is fixed to the attachment surface of the movable member 6 with the bolts 7. Specifically, the link member 3 is brought into tight contact with the attachment surface with the bolts 7, and the area over which the attachment surface and the link member 3 are in tight contact with each other (i.e., the hatched area in FIG. 3) is a fixed area.

Figure 4:
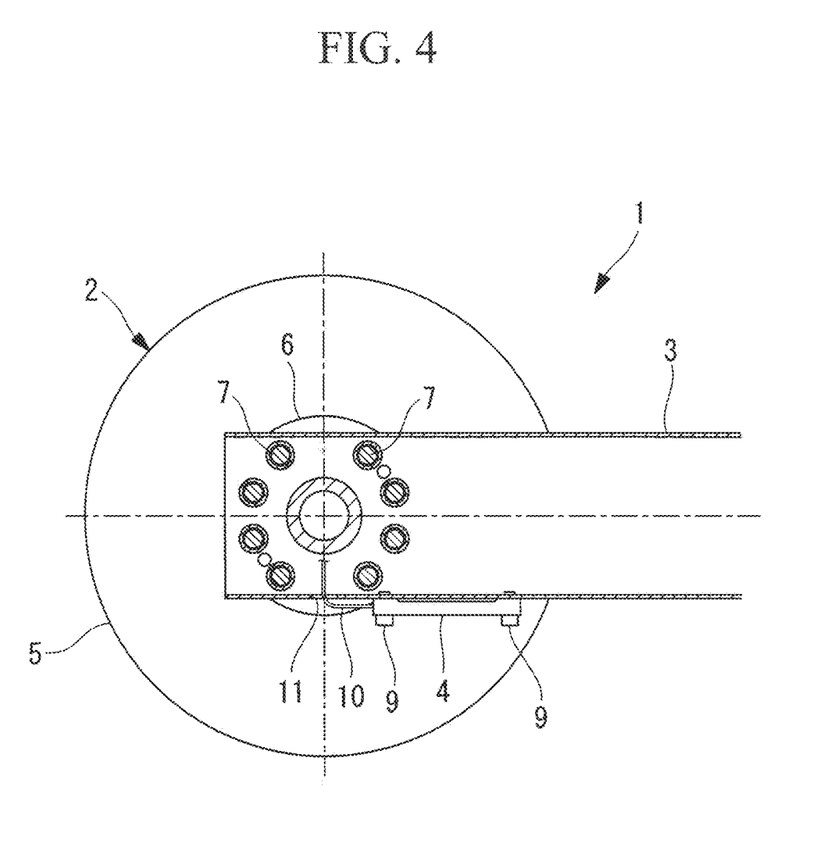
FIG. 4 is an enlarged view of a uniaxial strain sensor portion of the rotation-shaft joint structure in FIG. 1.

As shown in FIG. 4, the uniaxial strain sensor 4 is screwed to the link member 3, at one side surface (surface) located in a space between the outer circumferential surface of the fixed member 5 about the central axis A and the outer circumferential surface of the movable member 6 about the central axis, as viewed in the direction parallel to the central axis A of the fixed member 5. The uniaxial strain sensor 4 is formed in a strip shape, and the ends thereof are fixed to the link member 3 with screws 9 such that the longitudinal direction thereof is aligned with the longitudinal direction of the link member 3.

The one side surface of the link member 3 to which the uniaxial strain sensor 4 is fixed is substantially parallel to the central axis A of the fixed member 5.

In the drawings, reference sign 10 denotes a cable for extracting a signal output from the uniaxial strain sensor 4, and reference sign 11 denotes a through-hole provided in the link member 3 to allow the cable 10 to pass therethrough.

The operation of the thus-configured rotation-shaft joint structure 1 according to this embodiment will be described below.

In the rotation-shaft joint structure 1 according to this embodiment, when the fixed member 5 is fixed to the outside base member 8, and the motor (not shown) accommodated in the fixed member 5 is actuated, the movable member 6 is rotated about the central axis A, relative to the fixed member 5, and the link member 3 is pivoted about the central axis A.

When the link member 3 is pivoted and comes into contact with an outside object, a moment is applied to the link member 3, and thus, the link member 3 is bent in a plane perpendicular to the central axis A, causing a compression in the longitudinal direction of the link member 3 or a strain in the tensile direction in the surface of the link member 3. Specifically, when the link member 3 comes into contact with the outside object, the contact is detected in the form of the strain of the surface of the link member 3 by the uniaxial strain sensor 4 fixed to the side surface of the link member 3.

Figure 3:
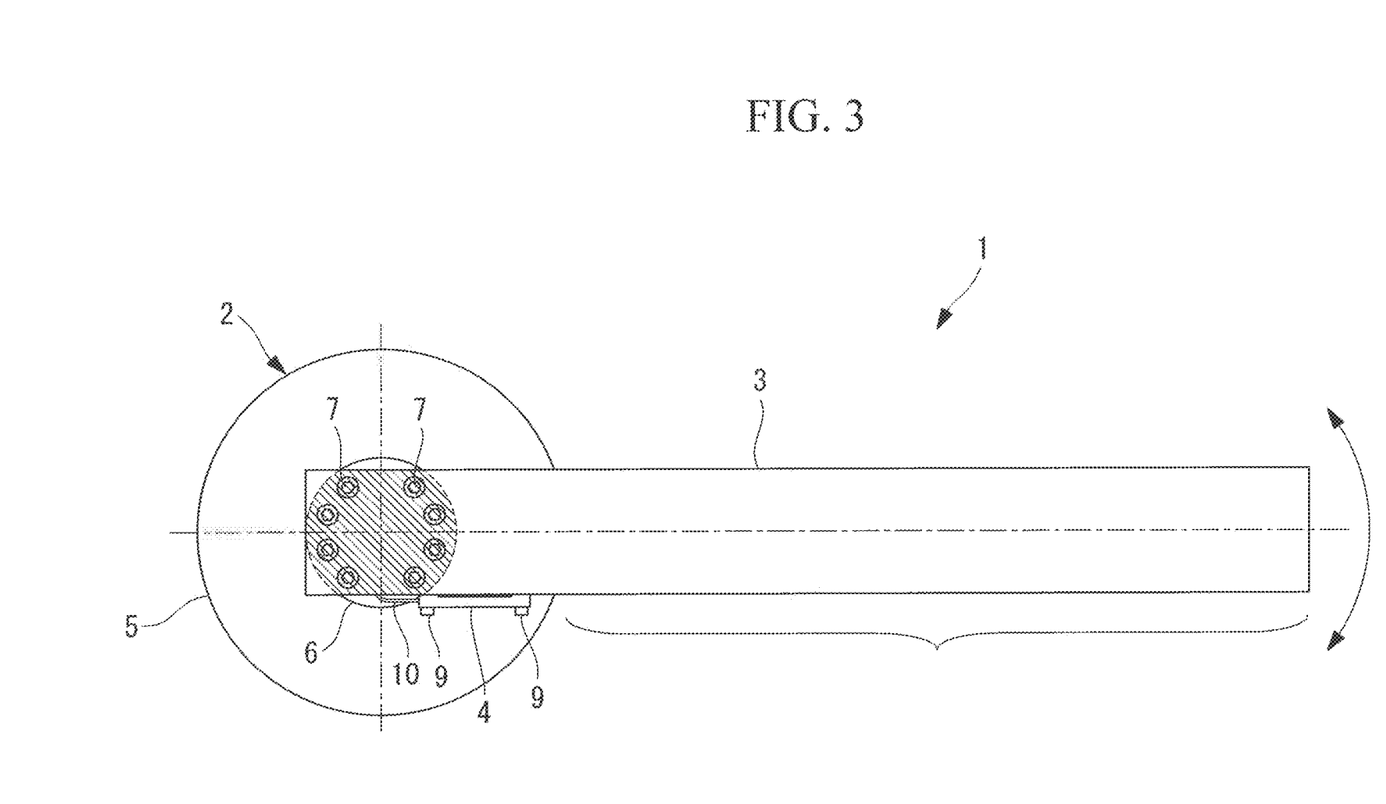
FIG. 3 is a front view of the rotation-shaft joint structure in FIG. 1.

In this case, by attaching the uniaxial strain sensor 4 to the link member 3, in the space between the outer circumferential surface of the movable member 6 about the central axis and the outer circumferential surface of the fixed member 5 about the central axis A, it is possible to detect, with the uniaxial strain sensor 4, the contact of the object with the link member 3 in the area radially outward of the outer circumferential surface of the fixed member 5 about the central axis A in FIG. 3.

There is an advantage in that, even when the object is nipped between the base member 8 and the link member 3, the object does not come into direct contact with the uniaxial strain sensor 4. Specifically, even when nipping occurs, it is possible to protect the uniaxial strain sensor 4 and to more reliably detect the occurrence of nipping.

There is another advantage in that, by detecting contact of the object with the link member 3 by using the uniaxial strain sensor 4, it is possible to reduce the cost, compared with a case where a torque sensor or a capacitance sensor is provided. There is an advantage in that it is possible to significantly cut the cost particularly when a plurality of rotation-shaft modules 2 are connected in series to form a multi-joint structure.

In this embodiment, because the uniaxial strain sensor 4 is attached to the side surface of the link member 3 that is substantially parallel to the central axis A of the fixed member 5, it is possible to highly sensitively detect the strain of the link member 3 in the plane perpendicular to the central axis A, thus leading to an advantage in that it is possible to detect contact between the link member 3 and the object.

In this embodiment, because the uniaxial strain sensor 4 is fixed to the side surface of the link member 3 with the screws 9, attachment is easier than in the case where an adhesive is used. Hence, it is possible to improve ease of assembly and reliability.

Figure 5:
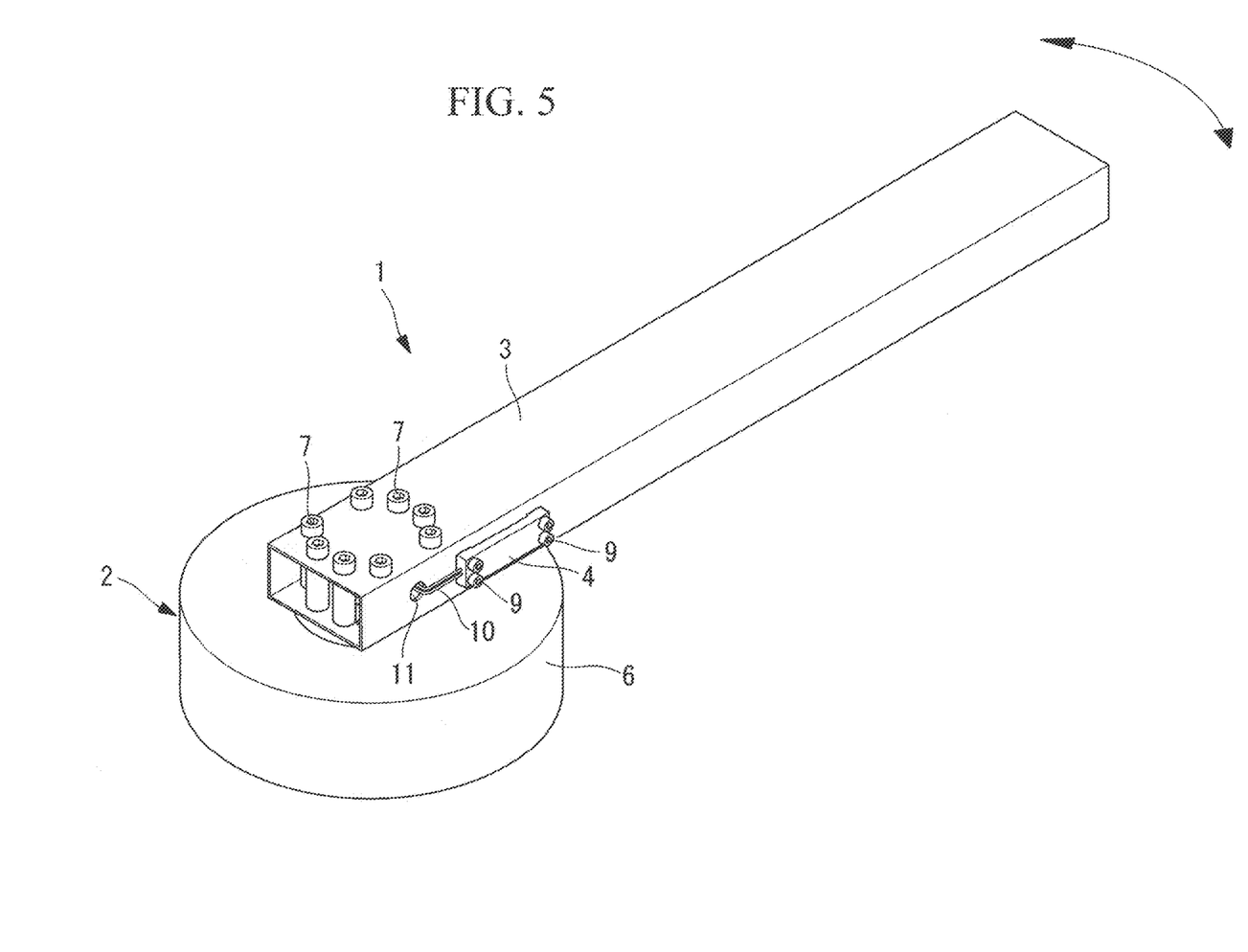
FIG. 5 is a perspective view of a first modification of the rotation-shaft joint structure in FIG. 1.
Figure 6:
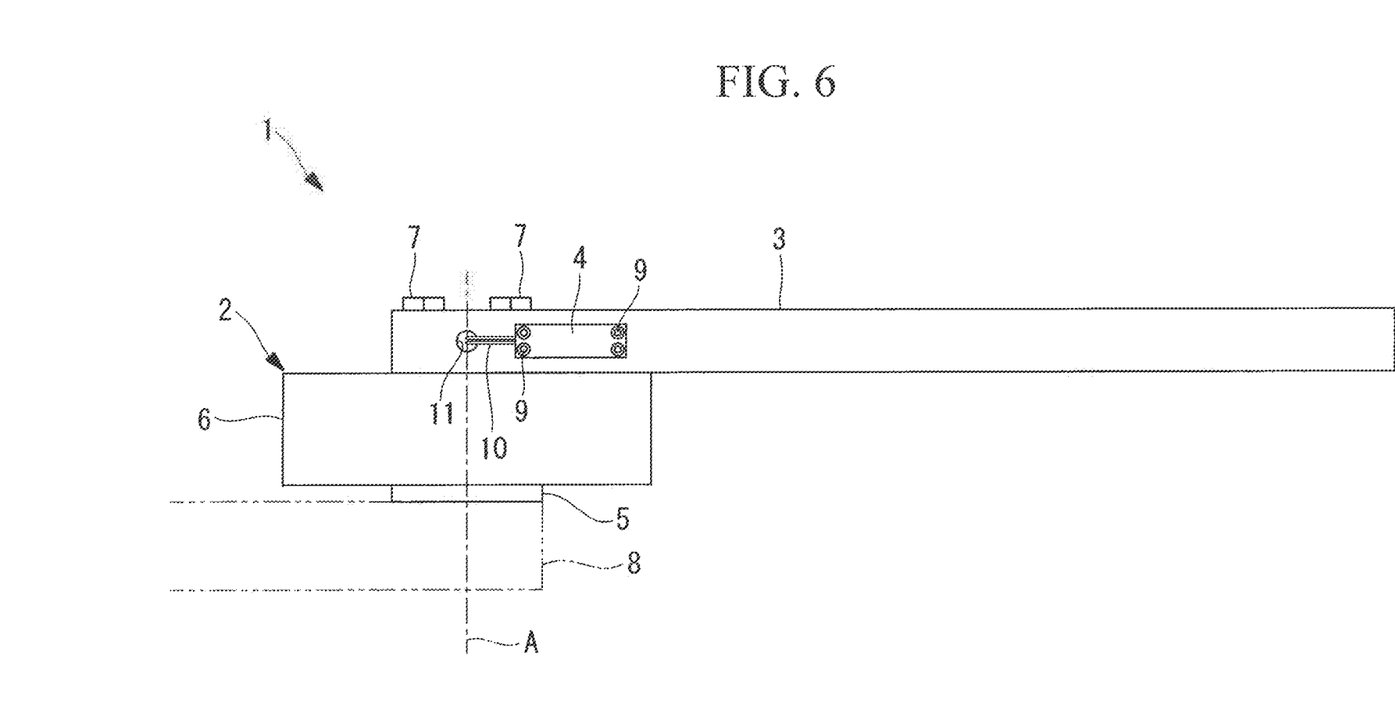
FIG. 6 is a side view of the rotation-shaft joint structure in FIG. 5.
Figure 7:
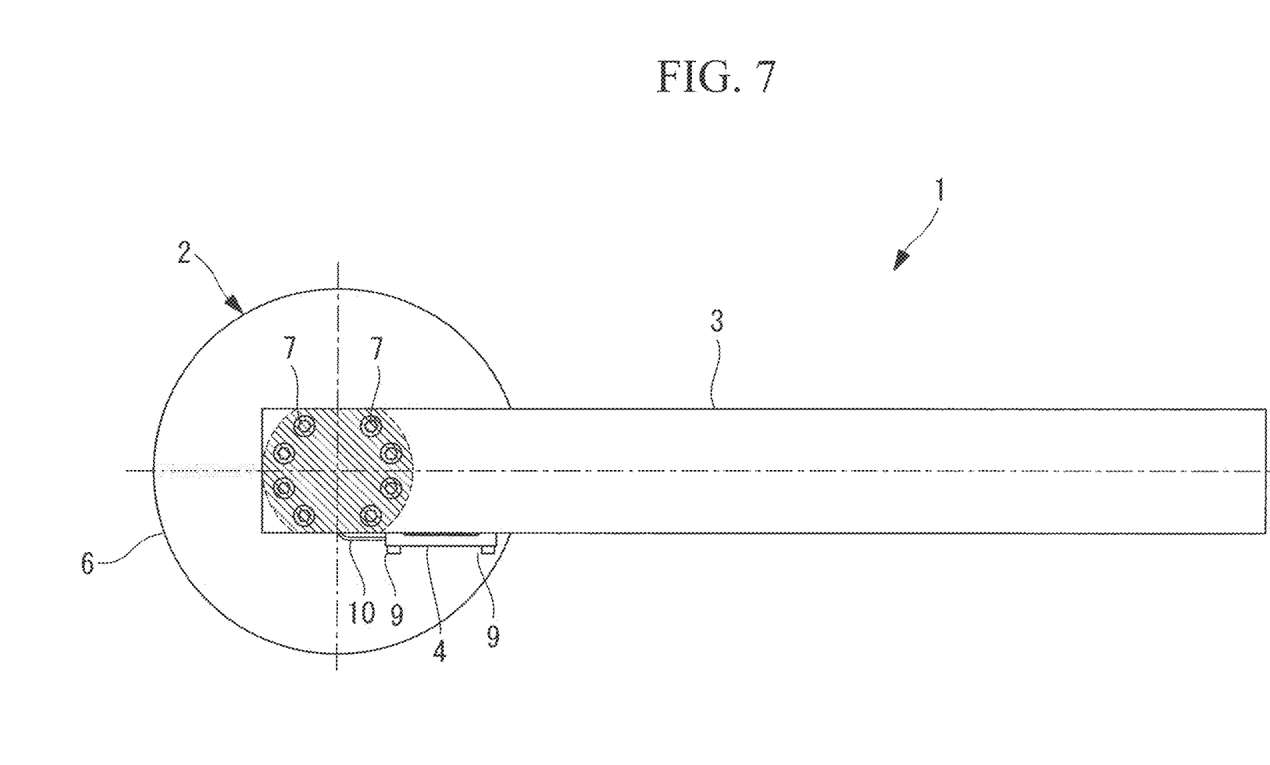
FIG. 7 is a front view of the rotation-shaft joint structure in FIG. 5.

In this embodiment, as shown in FIGS. 5 to 7, the outside diameter of the fixed member 5 fixed to the base member 8 may be smaller than the outside diameter of the movable member 6 fixed to the link member 3.

Also in this case, it is desirable to dispose the uniaxial strain sensor 4 on the link member 3, at a side surface located radially outward of the fixed area over which the link member 3 is fixed to the movable member 6, as shown by hatching in FIG. 7, and radially inward of the outer circumferential surface of the movable member 6 about the central axis. With this configuration, the uniaxial strain sensor 4 is protected by the movable member 6.

Figure 8:
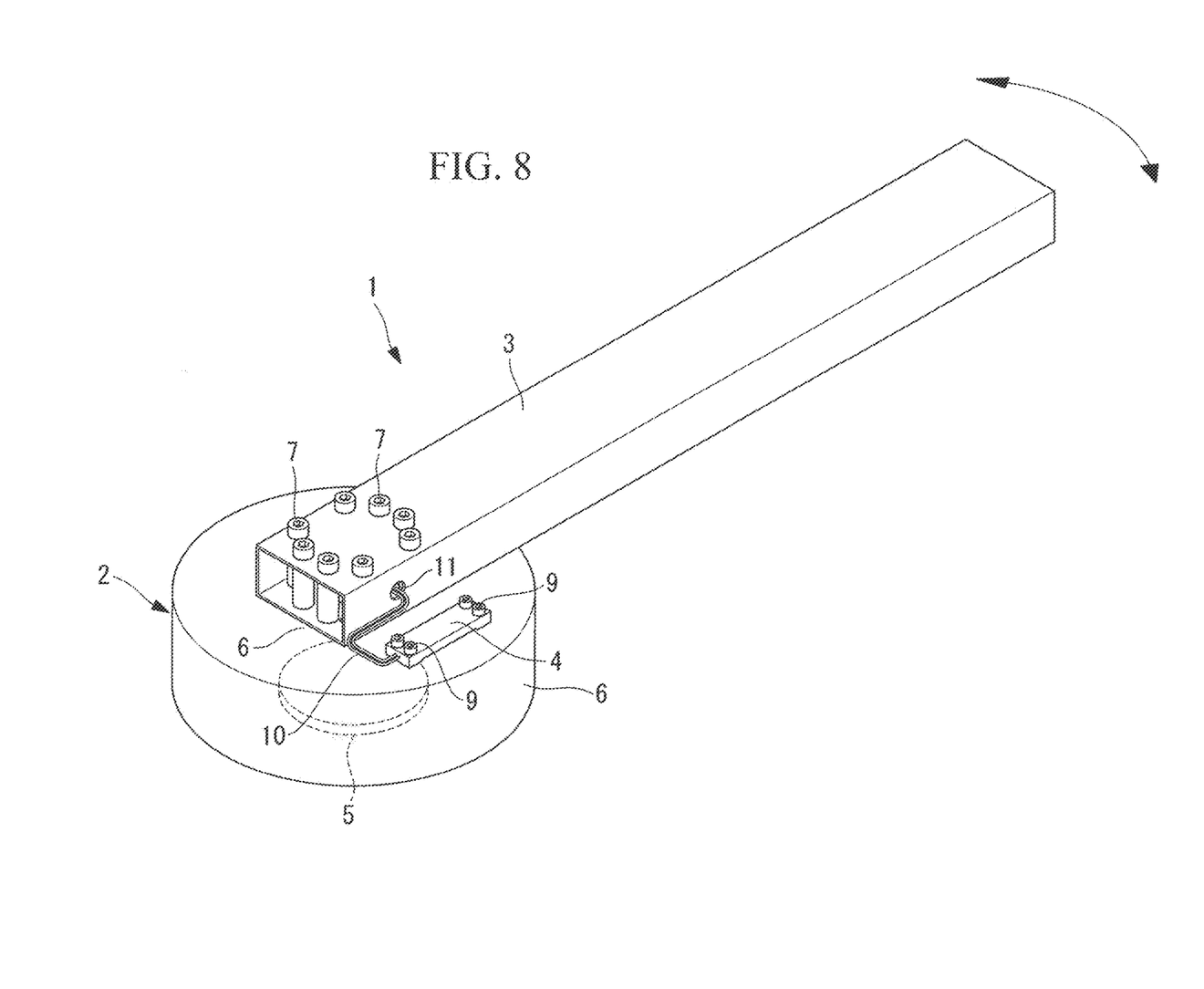
FIG. 8 is a perspective view of a second modification of the rotation-shaft joint structure in FIG. 1.

In this case, the uniaxial strain sensor 4 may be fixed to the surface of the movable member 6, as shown in FIG. 8, not necessarily to the side surface of the link member 3.

Figure 12:
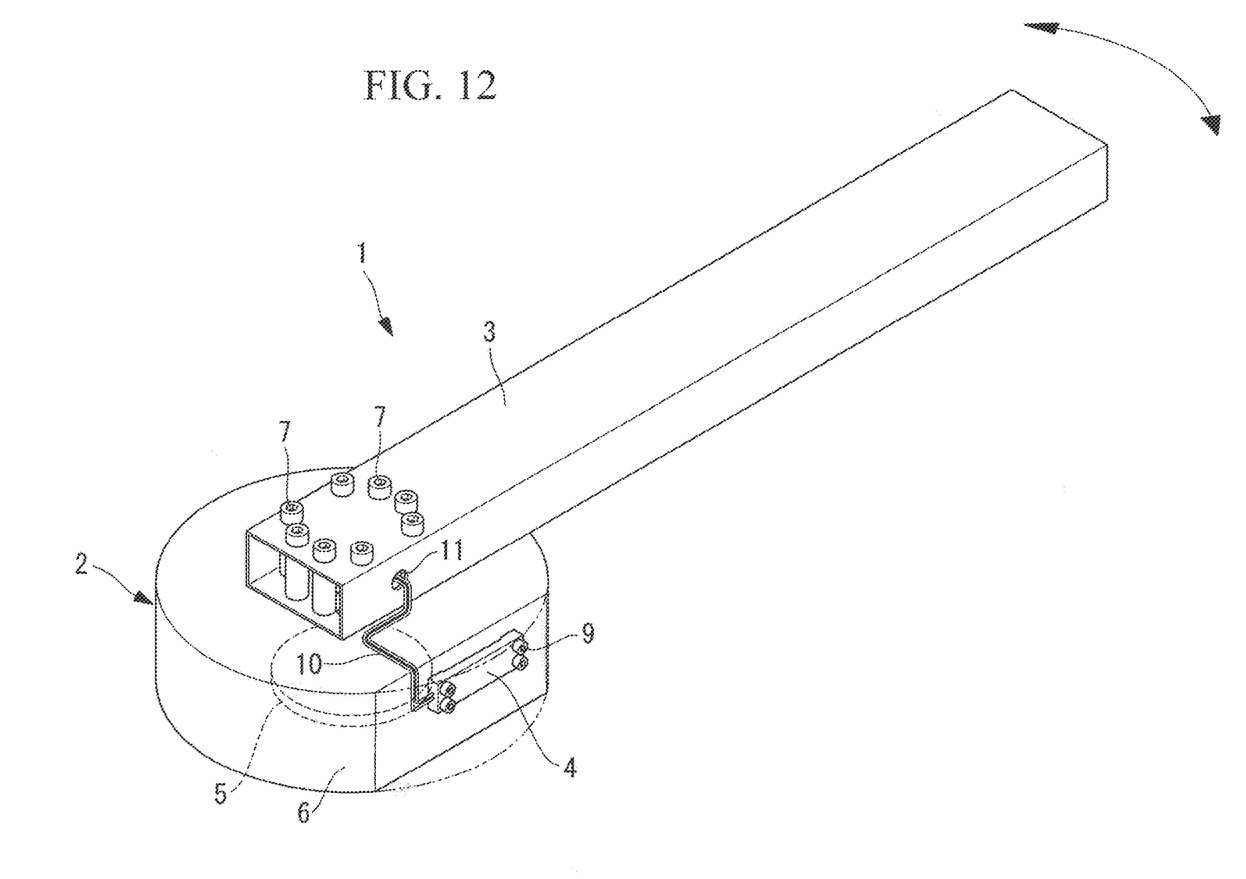
FIG. 12 is a perspective view of a fifth modification of the rotation-shaft joint structure in FIG. 1.
Figure 13:
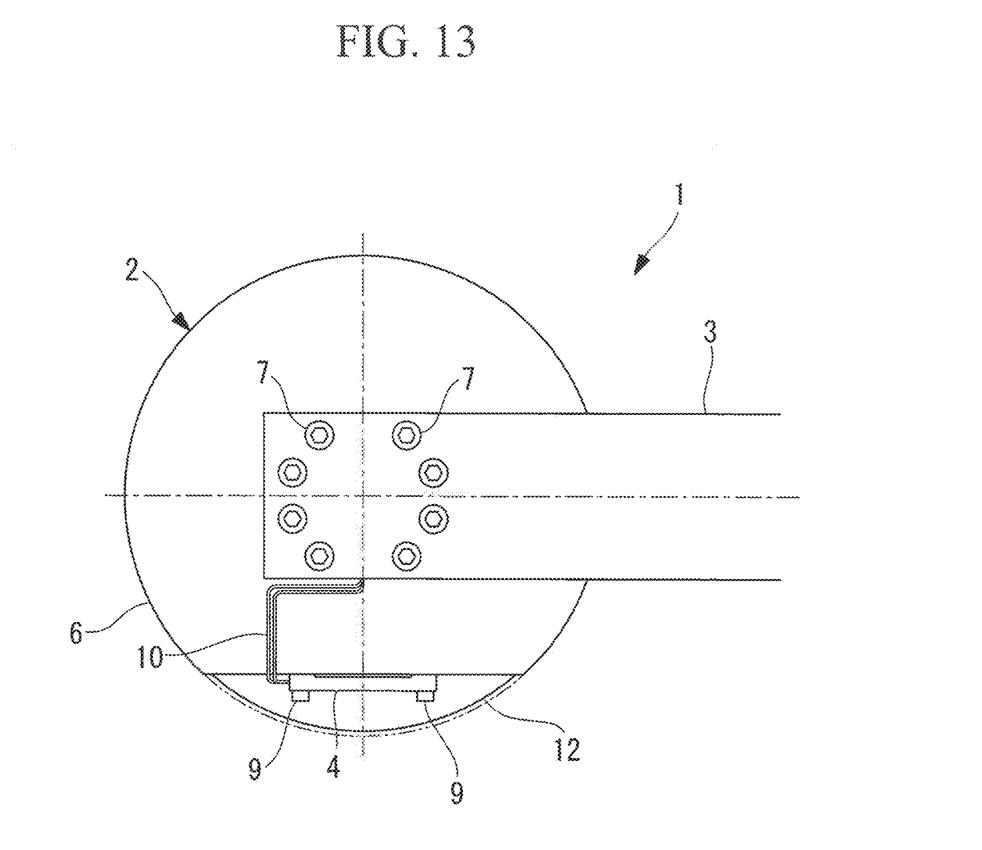
FIG. 13 is an enlarged view of a sixth modification of the rotation-shaft joint structure in FIG. 1.

As shown in FIG. 12, it is also possible to depress a portion of the outer circumferential surface of the movable member 6 about the central axis radially inward and dispose the uniaxial strain sensor 4 on the depressed portion in the outer circumferential surface such that the uniaxial strain sensor 4 does not project radially outward from the outer circumferential surface of the movable member 6 about the central axis before being depressed. In FIG. 12, the two-dot chain line shows the outer circumferential surface of the movable member 6 about the central axis before being depressed. In this case, as shown in FIG. 13, from the standpoint of appearance and to prevent the object from coming into direct contact with the uniaxial strain sensor 4, it is desirable to provide a cover 12 that covers the uniaxial strain sensor 4 and that does not project radially outward of the outer circumferential surface of the movable member 6 about the central axis before being depressed.

Figure 9:
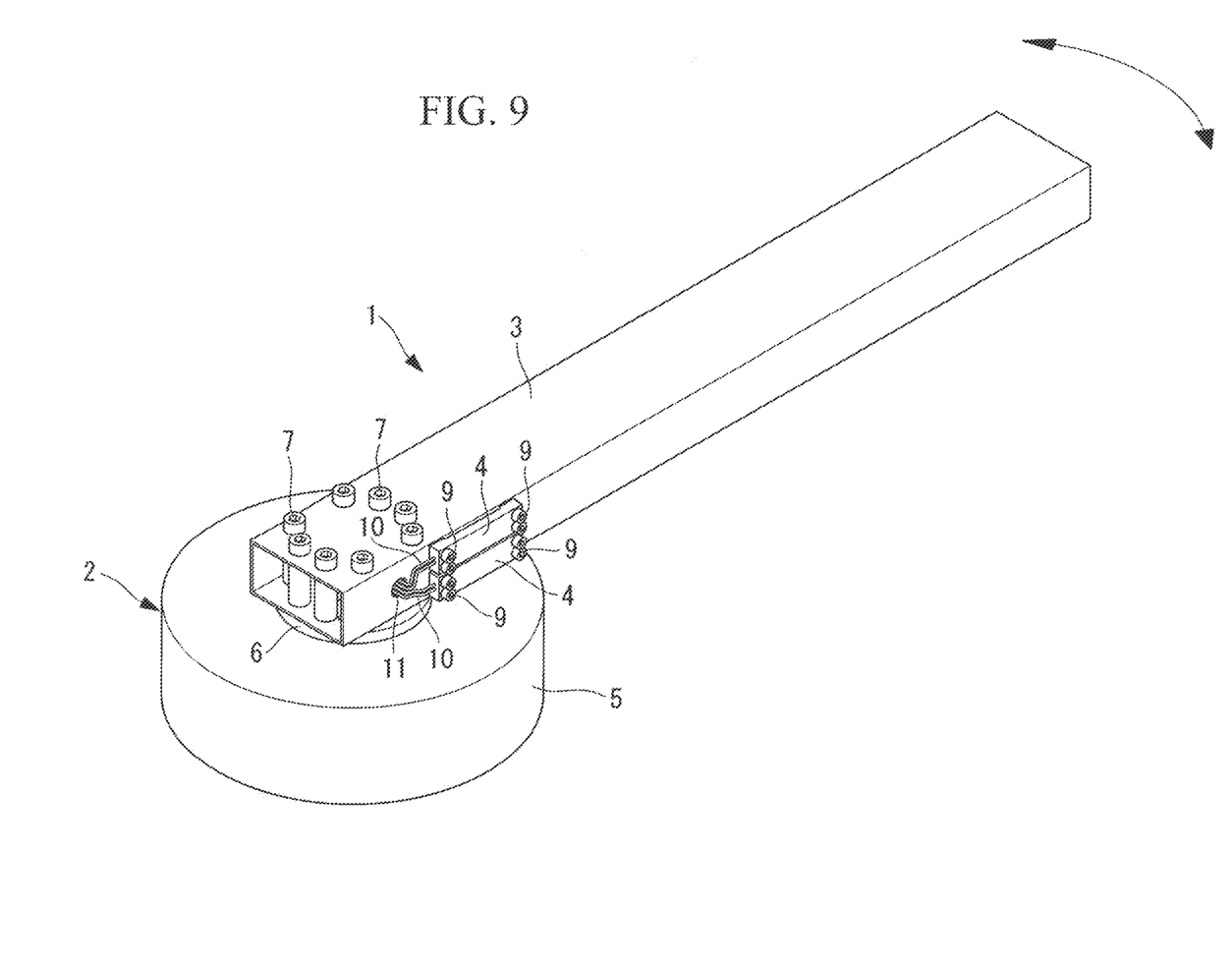
FIG. 9 is a perspective view of a third modification of the rotation-shaft joint structure in FIG. 1.

In this embodiment, as shown in FIG. 9, two or more uniaxial strain sensors 4 may be fixed side-by-side to measure the same strain in the link member 3. In this case, the uniaxial strain sensors 4 may be arranged either in parallel or in series. With this configuration, even when one of the uniaxial strain sensors 4 is broken, it is possible to detect contact of the object with the link member 3 by using the other uniaxial strain sensor 4 and then to quickly stop etc. the operation of the rotation-shaft module 2.

A single uniaxial strain sensor 4 may have two or more strain detection circuits in parallel. Also with this configuration, even when one of the strain detection circuits is damaged, it is possible to detect contact of the object with the link member 3 by using another strain detection circuit and then to quickly stop etc. the operation of the rotation-shaft module 2.

Figure 10:
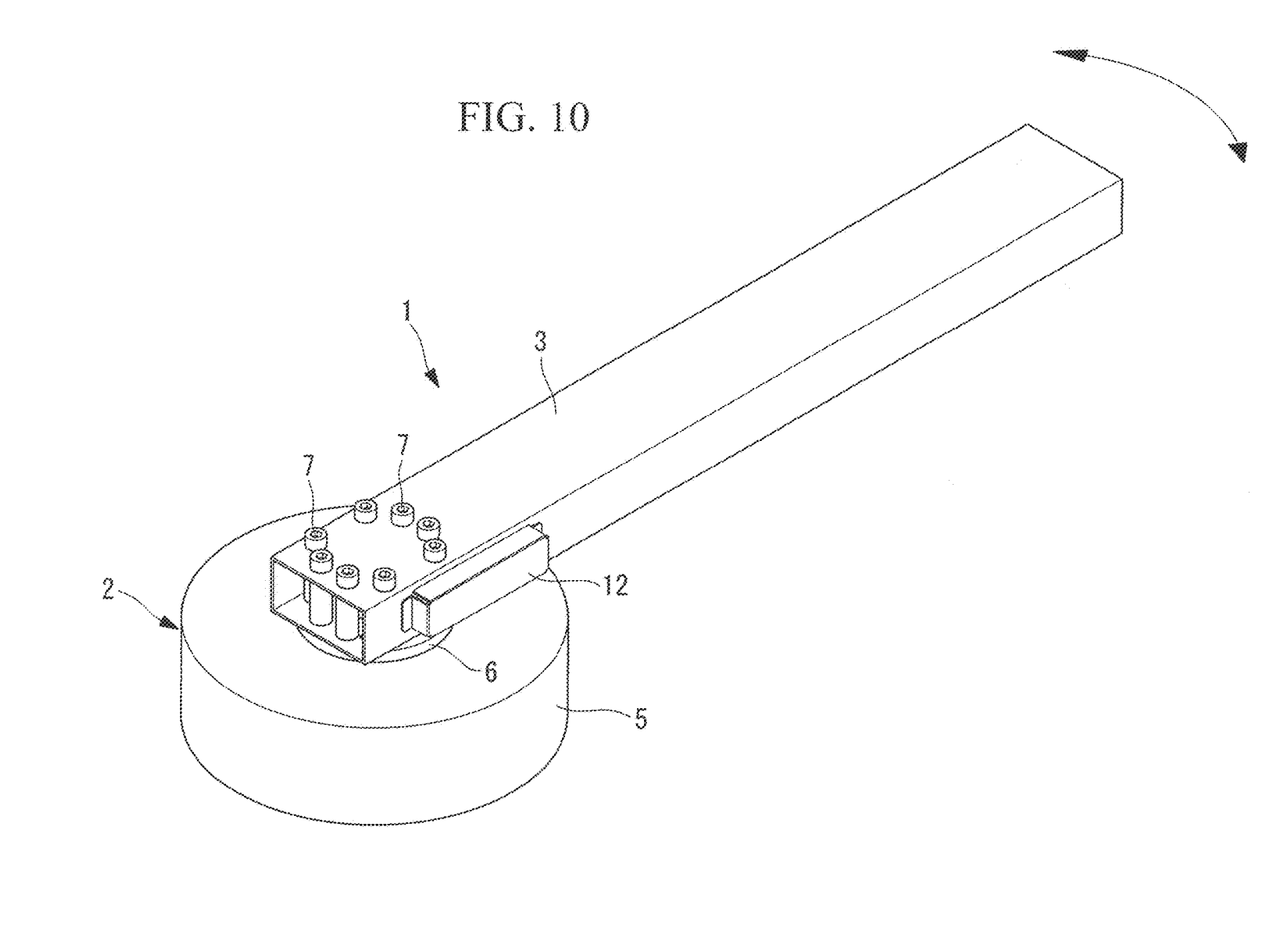
FIG. 10 is a perspective view of a fourth modification of the rotation-shaft joint structure in FIG. 1.
Figure 11:
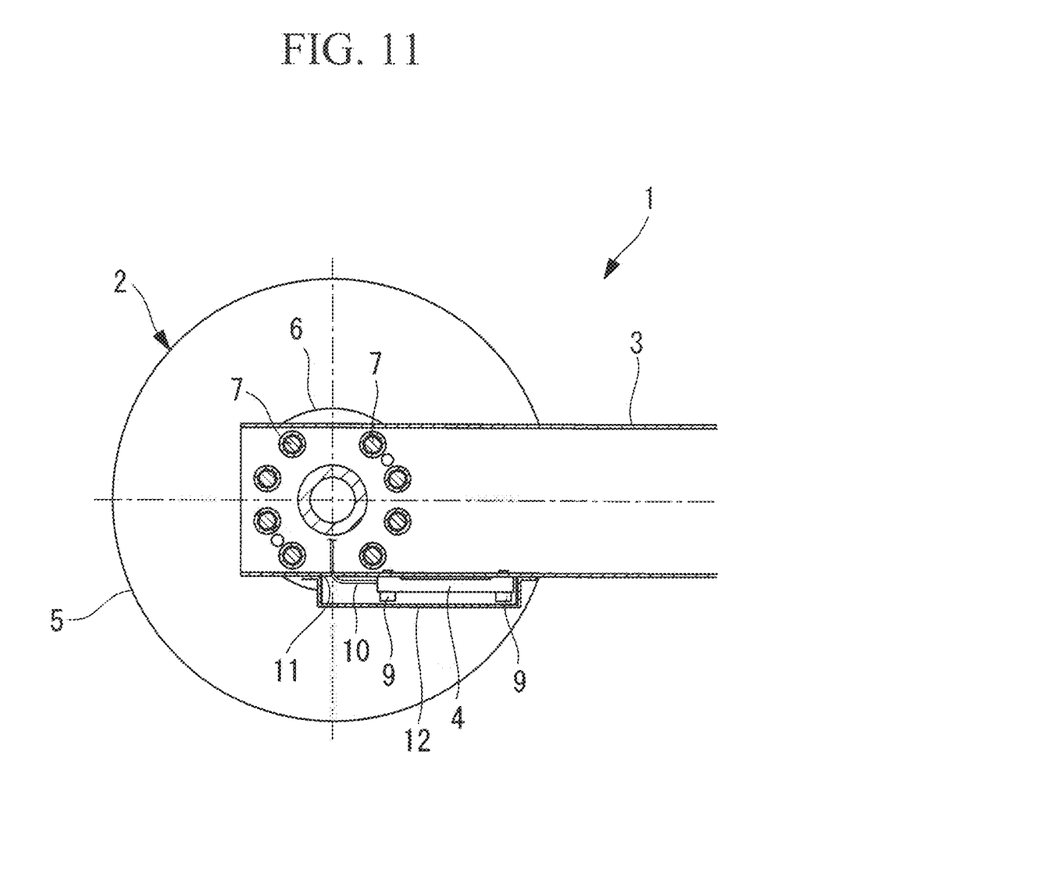
FIG. 11 is an enlarged view of a uniaxial strain sensor portion of the rotation-shaft joint structure in FIG. 10.

In this embodiment, as shown in FIGS. 10 and 11, the cover 12 for covering the uniaxial strain sensor 4 may be provided. This leads to an advantage in that it is possible to protect the uniaxial strain sensor 4 with the cover 12 such that nothing can come into contact with the uniaxial strain sensor 4, thus enabling more reliable prevention of erroneous detection of contact of the object with the link member 3.

In this embodiment, although a case where the uniaxial strain sensor 4 is fixed with the screws 9 has been described, the uniaxial strain sensor 4 may be fixed with adhesive.

Figure 14:
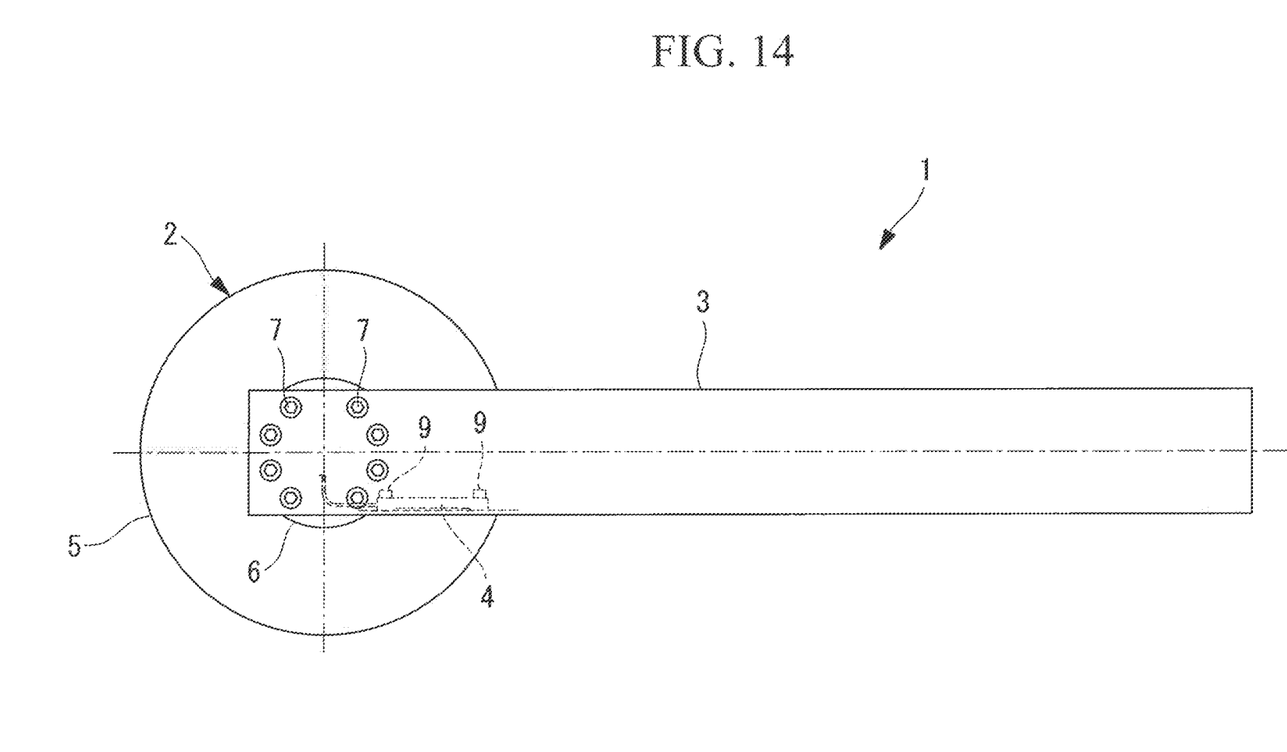
FIG. 14 is a front view of a seventh modification of the rotation-shaft joint structure in FIG. 1.

Although the above-described embodiment has been described by using an example in which the uniaxial strain sensor 4 is disposed on an outer surface that can be directly viewed from the outside, as shown in FIG. 14, a configuration in which the uniaxial strain sensor 4 is disposed on an inner surface of the link member 3 may also be used. This not only makes it easier to avoid direct contact between an object and the uniaxial strain sensor 4, but also reduces the need to provide the cover 12. Also in FIGS. 8 and 12, the uniaxial strain sensor 4 may be disposed on an inner surface of the link member 3.

The uniaxial strain sensor 4 may accommodate an amplifier (not shown) that converts the detected amount of strain into a current value or a voltage value. Because it is possible to send, with the accommodated amplifier, the detected amount of strain to the control unit in the form of a current value or a voltage value and there is no need to provide a space for installing the amplifier on the control unit side, it is possible to make the control unit compact. There is another advantage in that it is possible to simplify the installation task because it is only necessary to connect the cable 10 of the uniaxial strain sensor 4 to a signal input module of the control unit.

The uniaxial strain sensor 4 may include a serial communication circuit (not shown).

This enables the cables 10 leading from the plurality of uniaxial strain sensor 4 to be connected in series, leading to an advantage in that it is possible to minimize the number of the cables 10 to be routed in the case of, for example, a multi-joint structure in which a plurality of rotation-shaft modules 2 are attached. As a result, it is possible to reduce the cost and improve ease of cable handling.

As a result, the following aspect is read by the above described embodiment of the present invention.

An aspect of the present invention provides a rotation-shaft joint structure including: a driving-force generating part that includes a fixed member that is fixed to a base member, and a movable member that is rotationally driven about a predetermined axis relative to the fixed member; a link member that is fixed to the movable member of the driving-force generating part; and a uniaxial strain sensor that is attached to the link member or the movable member, at a surface located in a space between a fixed area over which the link member is fixed to the movable member and the outer circumferential surface of the driving-force generating part about the axis, to detect the strain of the surface.

In this embodiment, by fixing the fixed member to the outside base member and actuating the driving-force generating part, it is possible to rotationally drive the movable member about a predetermined axis relative to the fixed member. In this case, no matter to which part of the link member located radially outside the outer circumferential surface about the axis of the driving-force generating part the object comes into contact, it is possible to detect, with the uniaxial strain sensor, the contact of the object in the form of the strain of the surface of the link member or movable member.

By attaching the uniaxial strain sensor to the space between the area over which the link member is fixed to the movable member and the outer circumferential surface about the axis of the driving-force generating part, the object does not touch the uniaxial strain sensor even when the object is nipped between the base member and the link member. Thus, even when nipping occurs, it is possible to protect the uniaxial strain sensor, and it is possible to more reliably detect the occurrence of nipping. By detecting contact of the object with the link member by using the uniaxial strain sensor, it is possible to significantly reduce the cost, compared with a case where a torque sensor or a capacitance sensor is provided.

In the above-described aspect, the outside diameter of the movable member may be smaller than the outside diameter of the fixed member, and the uniaxial strain sensor may be disposed on the surface of the link member that is substantially parallel to the axis.

With this configuration, it is possible to more efficiently detect, with the uniaxial strain sensor, variations in torque applied to the link member that rotates about the axis.

In the above-described aspect, the uniaxial strain sensor may be fixed to the surface with a screw.

With this configuration, it is possible to easily and reliably fix the uniaxial strain sensor to the surface, thus improving ease of assembly and reliability.

In the above-described aspect, the uniaxial strain sensor may include an amplifier that converts the detected amount of strain into a current value or a voltage value.

With this configuration, it is possible to simplify the configuration of the control unit to which the uniaxial strain sensor is connected.

In the above-described aspect, the uniaxial strain sensor may include a serial communication circuit.

With this configuration, when used in a robot having a plurality of rotation-shaft joints, it is possible to minimize the number of cables used to transmit detection signals from the uniaxial strain sensor to the control unit, thus reducing cost and improving ease of cable handling.

In the above-described aspect, at least two of the uniaxial strain sensors may be provided side-by-side.

With this configuration, even when one of the uniaxial strain sensors is broken, it is possible to detect contact of the object with the link member by using the other uniaxial strain sensor.

In the above-described aspect, the uniaxial strain sensor may be capable of detecting a strain with at least two circuits in parallel.

With this configuration, by enabling detection of strain with parallel circuits in a single uniaxial strain sensor, even when one circuit is broken, it is possible to detect contact of the object with the link member by using the other circuit with a simple configuration.

In the above-described aspect, the rotation-shaft joint structure may further include a cover for covering the uniaxial strain sensor.

With this configuration, it is possible to protect the uniaxial strain sensor with the cover, thus preventing erroneous detection of contact of the object with the link member.

REFERENCE SIGNS LIST

1 rotation-shaft joint structure
2 rotation-shaft module (driving-force generating part)
3 link member
4 uniaxial strain sensor
5 fixed member
6 movable member
8 base member 9 screw
12 cover
A central axis (axis)

The invention claimed is:

1. A rotation-shaft joint structure comprising:
a driving-force generating part that includes a fixed member that is fixed to a base member, and a movable member that is rotationally driven about a predetermined axis relative to the fixed member;
a link member that is fixed to the movable member of the driving-force generating part;
when viewed in a direction along a central axis of the fixed member, a uniaxial strain sensor is disposed inside a space between a fixed area over which the link member is fixed to the movable member and an outer circumferential surface of the driving-force generating part about the central axis, the uniaxial strain sensor is attached to a surface of the link member or the movable member located in the space; and
wherein the uniaxial strain sensor is configured to detect strain of the surface.

2. The rotation-shaft joint structure according to claim 1, wherein outside diameter of the movable member is smaller than outside diameter of the fixed member, and the uniaxial strain sensor is disposed on the surface of the link member that is substantially parallel to the central axis.

3. The rotation-shaft joint structure according to claim 1, wherein the uniaxial strain sensor is fixed to the surface with a screw.

4. The rotation-shaft joint structure according to claim 1, wherein the uniaxial strain sensor includes an amplifier that converts the detected amount of strain into a current value or a voltage value.

5. The rotation-shaft joint structure according to claim 1, wherein the uniaxial strain sensor includes a serial communication circuit.

6. The rotation-shaft joint structure according to claim 1, wherein at least two of the uniaxial strain sensors are provided side-by-side.

7. The rotation-shaft joint structure according to claim 1, wherein the uniaxial strain sensor is capable of detecting strain with at least two circuits in parallel.

8. The rotation-shaft joint structure according to claim 1, further comprising a cover for covering the uniaxial strain sensor.

* * * * *